(12) United States Patent
Homewood et al.

(10) Patent No.: US 7,337,306 B2
(45) Date of Patent: Feb. 26, 2008

(54) EXECUTING CONDITIONAL BRANCH INSTRUCTIONS IN A DATA PROCESSOR HAVING A CLUSTERED ARCHITECTURE

(75) Inventors: Mark Owen Homewood, Winscombe (GB); Gary L. Vondran, San Carlos, CA (US); Geoffrey M. Brown, Watertown, MA (US); Paolo Faraboschi, Brighton, MA (US)

(73) Assignees: STMicroelectronics, Inc., Carrollton, TX (US); Hewlett-Packard Company, Palo Alto, CA (US)

( * ) Notice: Subject to any disclaimer, the term of this patent is extended or adjusted under 35 U.S.C. 154(b) by 524 days.

(21) Appl. No.: 09/751,410

(22) Filed: Dec. 29, 2000

(65) Prior Publication Data

US 2002/0087848 A1   Jul. 4, 2002

(51) Int. Cl.
*G06F 9/32* (2006.01)
(52) U.S. Cl. .................................... 712/234; 712/28
(58) Field of Classification Search ........ 712/233–244, 712/211, 28, 207, 208
See application file for complete search history.

(56) References Cited

U.S. PATENT DOCUMENTS 4,777,589 A * 10/1988 Boettner et al. ............... 710/3
4,991,080 A *  2/1991 Emma et al. ............... 712/206

* cited by examiner

*Primary Examiner*—Tonia L. Meonske
(74) *Attorney, Agent, or Firm*—Lisa K. Jorgenson; William A. Munck

(57) ABSTRACT

There is disclosed a data processor having a clustered architecture that comprises at least one branching cluster, at least one non-branching cluster and remote conditional branching control circuitry. Each of the clusters is capable of computing branch conditions, though only the branching cluster is operable to perform branch address computations. The remote conditional branching control circuitry, which is associated with each of the clusters, is operable in response to sensing a conditional branch instruction in a non-branching cluster to (i) cause the branching cluster to compute a branch address and a next program counter address,(ii) cause the non-branching cluster to compute a branch condition, and (iii) communicate the computed branch condition from the non-branching cluster to the branching cluster. The data processor then uses the computed branch condition to select one of the branch address or the next program counter address.

20 Claims, 7 Drawing Sheets

EXECUTING CONDITIONAL BRANCH INSTRUCTIONS IN A DATA PROCESSOR HAVING A CLUSTERED ARCHITECTURE

CROSS-REFERENCE TO RELATED APPLICATIONS

The present invention is related to those disclosed in the following United States patent applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,331, filed concurrently herewith, entitled "PROCESSOR PIPELINE STALL APPARATUS AND METHOD OF OPERATION";
3) Ser. No. 09/751,371, filed concurrently herewith, entitled "CIRCUIT AND METHOD FOR HARDWARE-ASSISTED SOFTWARE FLUSHING OF DATA AND INSTRUCTION CACHES";
4) Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
5) Ser. No. 09/751,377, filed concurrently herewith, entitled "BYPASS CIRCUITRY FOR USE IN A PIPELINED PROCESSOR";
6) Ser. No. 09/751,408, filed concurrently herewith, entitled "SYSTEM AND METHOD FOR ENCODING CONSTANT OPERANDS IN A WIDE ISSUE PROCESSOR";
7) Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8) Ser. No. 09/751,674, filed concurrently herewith, entitled "CIRCUIT AND METHOD FOR INSTRUCTION COMPRESSION AND DISPERSAL IN WIDE-ISSUE PROCESSORS";
9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to a data processor capable of executing conditional branch instructions in a data processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution advantage rate that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors. However, in many applications it is essential to minimize the size, cost, and power requirements of a data processor. This has led to the development of processors that are optimized to meet particular size, cost and/or power limits. For example, the recently developed Transmeta Crusoe™ processor reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices).

In general, an important design objective for data processors used in consumer appliances and office equipment is the minimization of cost and complexity of the data processor. One way to minimize cost and complexity is to exclude from the processor core functions that can be implemented with memory-mapped peripherals external to the core. For example, cache flushing may be performed using a small memory-mapped device controlled by a specialized software function. The cost and complexity of a data processor may also minimized by implementing extremely simple exception behavior in the processor core.

As noted above, a wide-issue processor pipeline executes bundles of operations in multiple stages. In a wide-issue processor, multiple concurrent operations are bundled into a single instruction and are issued and executed as a unit. In a clustered architecture, the machine resources are divided into clusters where each cluster consists of one or more register files each of which is associated with a subset of the execution units of the data processor. Communication between clusters is generally restricted, which presents a significant problem when executing branch instructions— instructions requiring the "jumps" within program execution steps. In such clusters, branch conditions require large amounts of replicated processing resources or an abundance of global communication wires. Once implemented, such processors are commonly rigid, which precludes any reasonable degree of scalability in the branching architecture.

Two architectures that include partitioned register files, address the foregoing problem in different ways. First, there is the Multiflow Trace architecture which allows multiple branches per cycle (or multi-way branches). This implementation requires that each cluster have its own branch unit that uses local conditions and targets, as well as a global controller, to select a final next program counter address. One major disadvantage of the Multiflow Trace architecture is a requirement of large global communication to perform a branch, which detrimentally impacts both speed and solution cost. Another major disadvantage of the Multiflow Trace architecture is that it is not reasonably possible to use data in one cluster to trigger a branch in another cluster.

Second, there is the Texas Instruments TMS3420C6000 architecture, which allows one branch per cluster (with restrictions). However, multiple branches in one bundle cause undefined behavior when more than one branch condition is a "true" condition. In other words, the Texas Instruments TMS3420C6000 architecture only supports single-way branches that can be executed on any cluster. This has disadvantages similar to the Multiflow Trace architecture, namely, long connection paths, need to move branch targets to a "global controller," etc.

Another way to minimize cost and complexity is to exclude from the processor core functions that can be implemented with memory-mapped peripherals external to the core. For example, cache flushing may be performed using a small memory-mapped device controlled by a specialized software function. The cost and complexity of a data processor may also be minimized by implementing extremely simple exception behavior in the processor core.

A wide-issue processor pipeline, in contrast, executes bundles of operations in multiple stages. In a wide-issue processor, multiple concurrent operations are bundled into a single instruction and are issued and executed as a unit. In a clustered architecture, the machine resources are divided into clusters where each cluster consists of one or more register files each of which is associated with a subset of the execution units of the data processor.

A problem exists in that, to process these bundled instructions, the wide-issue processor pipeline consumes a large amount of power. For instance, a wide-issue processor will commonly execute "bundles" of operations in multiple stages, wherein each stage in the pipeline is as wide as the executed word. Because it is generally not possible to completely populate a wide instruction with useful work (i.e., instructions), it is necessary to insert "dummy" instructions (i.e., non-operations) to fill all available slots. The problem arises in that these inserted "dummy" instructions consume power at each stage. Additionally, in normal operation, wide-issue processors require insertion of explicit non-operations to schedule correctly program execution (i.e., a feature of wide-issue processors over traditional sequential processors), and these non operations also consume power at each execution stage. As another example, power consumption problems can occur when repeated processor execution of small code sequences occurs as tight loops while unnecessary time is spent and power is expended in the cache.

Many data processors are not designed with a low/no power consumption mode, let alone functional units of the same, and, therefore, power consumption cannot be sufficiently reduced. Excessive power consumption by wide-issue data processors remains a continuing problem.

Therefore, there is a need in the art for improved data processors in which the cost and complexity of the processor core is minimized while maintaining the processor throughput. In particular, there is a need for improved systems and methods for executing conditional branch instructions in a data processor. More particularly, there is a need for systems and methods capable of addressing the problem of using remote branch conditions, while maintaining a local branch address computation, avoiding large amounts of global communication, and enabling a relatively good degree of scalability in the branch architecture. There is also a need in the art for improved data processors in which the cost and complexity of the processor core is minimized while maintaining the processor throughput. In particular, there is a need for improved systems and methods for reducing power consumption in a wide-issue data processor. More particularly, there is a need for systems and methods capable of addressing wasted power and time associated with unnecessary cache accesses.

SUMMARY OF THE INVENTION

To address the above-discussed deficiencies of the prior art, it is a primary object of the present invention to provide a data processor having a clustered architecture and that comprises at least one branching cluster, a plurality of non-branching clusters and remote conditional branching control circuitry. Broadly, the data processor operates to (i) keep program counter ("PC") address computation and, possibly, multiplexing local to the branching cluster, and (ii) compute branch condition (and, possibly, branch priorities in multi-way branching schemes) in any cluster and communicate branch conditions to the branching cluster when the same is computed in a non-branching cluster.

According to an advantageous embodiment, each cluster is capable of computing branch conditions, though only a branching cluster(s) is operable to perform branch address computations. The remote conditional branching control circuitry, which is associated with each of the clusters, is operable in response to sensing a conditional branch instruction in a non-branching cluster to (i) cause the branching cluster to compute a branch address and a next program counter address, (ii) cause the non-branching cluster to compute a branch condition, and (iii) communicate the computed branch condition from the non-branching cluster to the branching cluster. The data processor then uses the computed branch condition to select one of the branch address and the next program counter address.

Preferably, the foregoing may suitably be accomplished, at least in part, through the issuance of a shadow branch instruction in the branching cluster corresponding to the conditional branch instruction existing in the non-branching cluster. An important aspect of this embodiment is that it is possible to optimize for speed while avoiding relatively long and slow global communication delays for PC targets. Another related aspect is that required amounts of communication wires are suitably minimized.

According to one embodiment of the present invention, each of the clusters comprises an instruction execution pipeline comprising N processing stages, each of the N processing stages is capable of performing at least one of a plurality of execution steps associated with a pending instruction being executed by the instruction execution pipeline. According to a related embodiment of the present invention, each of the clusters comprises at least one register file.

According to another embodiment of the present invention, the remote conditional branching control circuitry further causes the branching cluster to perform a next program counter address computation in response to sensing a conditional branch instruction in the non-branching cluster. According to a related embodiment of the present invention, the remote conditional branching control circuitry selects one of the computed next program counter address and the computed branch address in response to the value of the computed branch condition. In a further related embodiment of the present invention, the remote conditional branching control circuitry comprises a multiplexor that is responsive to the computed branch condition.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" and "circuitry" means any device, system or part thereof that controls at least one operation, such a device, system or part thereof may be implemented in hardware, firmware or software, or some combination of at least two of the same. It should be noted that the functionality associated with any particular controller or circuitry may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor supporting a clustered architecture.

Figure 1:
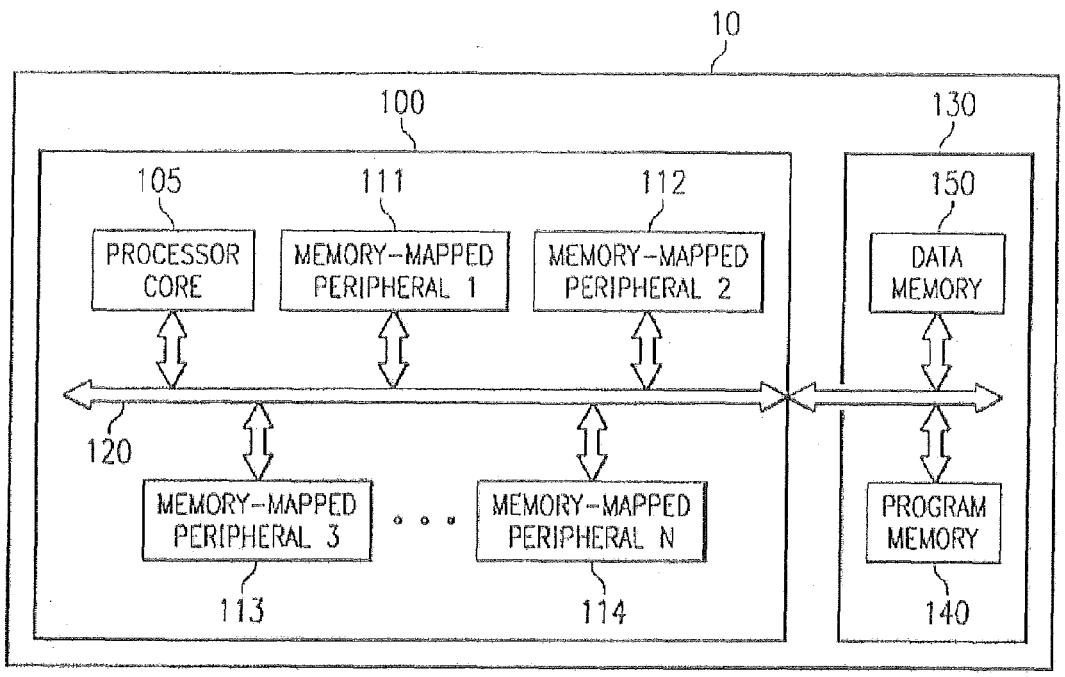
FIG. 1 illustrates a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111-114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111-114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111-114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111-114 may be externally coupled to data processor 100. Similarly, in another embodiment of the present invention, one or both of program memory 140 and data memory 150 may be disposed on-chip in data processor 100.

Figure 2A:
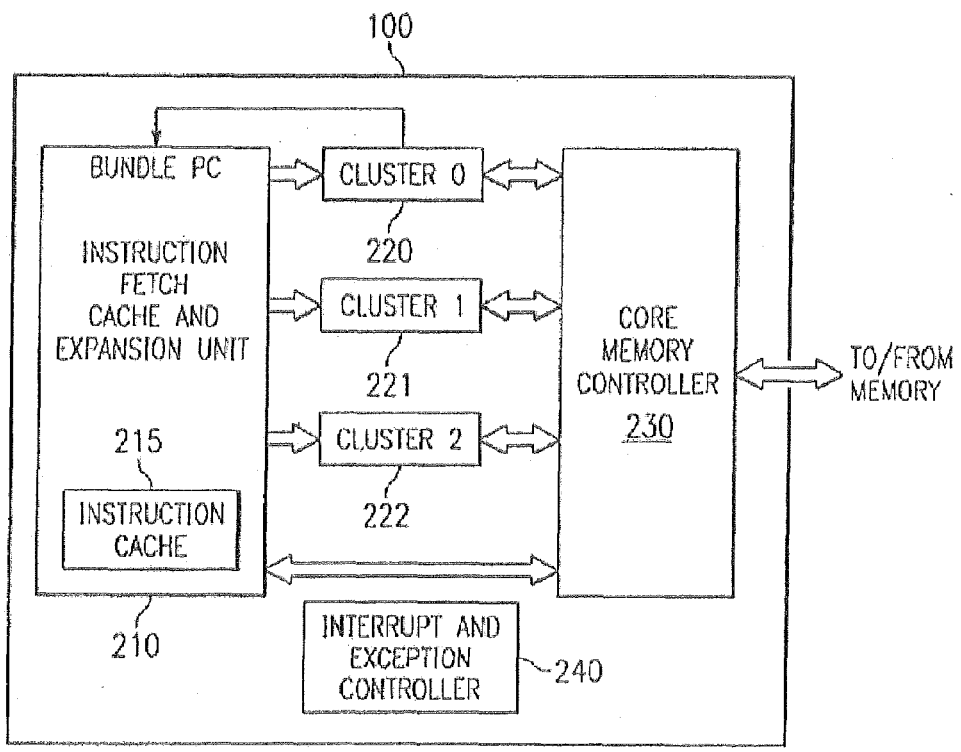
FIGS. 2A and 2B illustrate the exemplary data processor in greater detail according to various embodiments of the present invention.
Figure 2B:
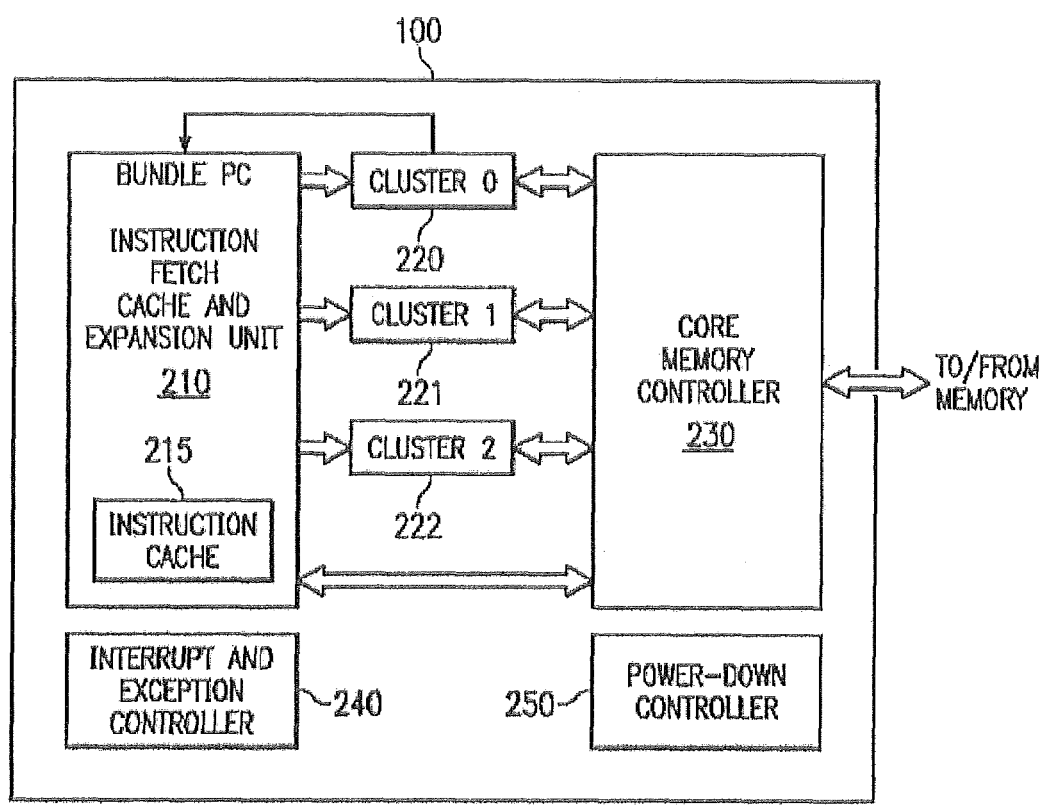

FIGS. 2A and 2B are more detailed block diagrams of exemplary data processor 100 according to various embodiments of the present invention. In the embodiment of FIG. 2A. data processor 100 comprises instruction fetch cache and expansion unit (IFCEXU) 210, which contains instruction cache 215, and a plurality of clusters, including exemplary clusters 220-222. Exemplary clusters 220-222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220-222 are basic execution units that comprise one or more arithmetic units, a register file, an interface to core memory controller 230, including a data cache, and an inter-cluster communication interface. As will be described in greater detail hereafter, it is preferable that at least one of clusters 220-222 is a branching cluster (for instance cluster 220) while the remaining clusters are non-branching clusters. Each cluster 220-222 is capable of computing branch conditions, though only branching cluster 220 is operable to perform branch address computations. According to the present embodiment, data processor 100 operates, in response to sensing a conditional branch instruction in a non-branching cluster, to (i) cause branching cluster 220 to compute a branch address and a next program counter address, (ii) cause non-branching clusters 221-222 to compute a branch condition, and (iii) communicate the computed branch condition from non-branching clusters 221-222 to branching cluster 220. Data processor 100 then uses the computed branch condition to select one of the branch address and the next program counter address.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

As shown in FIG. 2B, data processor 100 may also comprise power-down controller 250. Exemplary power-down controller 250 monitors the instruction cache 220 and the instruction execution pipeline of clusters 220-222 to identify power-down conditions associated with the same and, in response to an identified power-down condition, at least one of: (i) bypasses performance of at least a portion of subsequent processing stages associated with an executing instruction, (ii) powers down the instruction cache 220, or (iii) powers down the data processor 100. According to this embodiment, data processor 100 further comprises an instruction fetch buffer or instruction buffer (introduced hereafter), and power-down controller 250 operates to detect the presence of at least one of: (i) a non-operation in one of clusters 220-222, (ii) a tight-loop condition in the instruction fetch buffer, or (iii) an idle-loop condition.

In the embodiment illustrated in FIG. 1B, power-down controller 250 is shown disposed within data processor 100. It will be appreciated by those skilled in the art that this particular configuration is shown by way of illustration only and should not be construed so as to limit the scope of the present invention in any way. In alternative embodiments of the present invention, all or a portion of power-down controller 250 may be externally associated with data processor 100.

Figure 3:
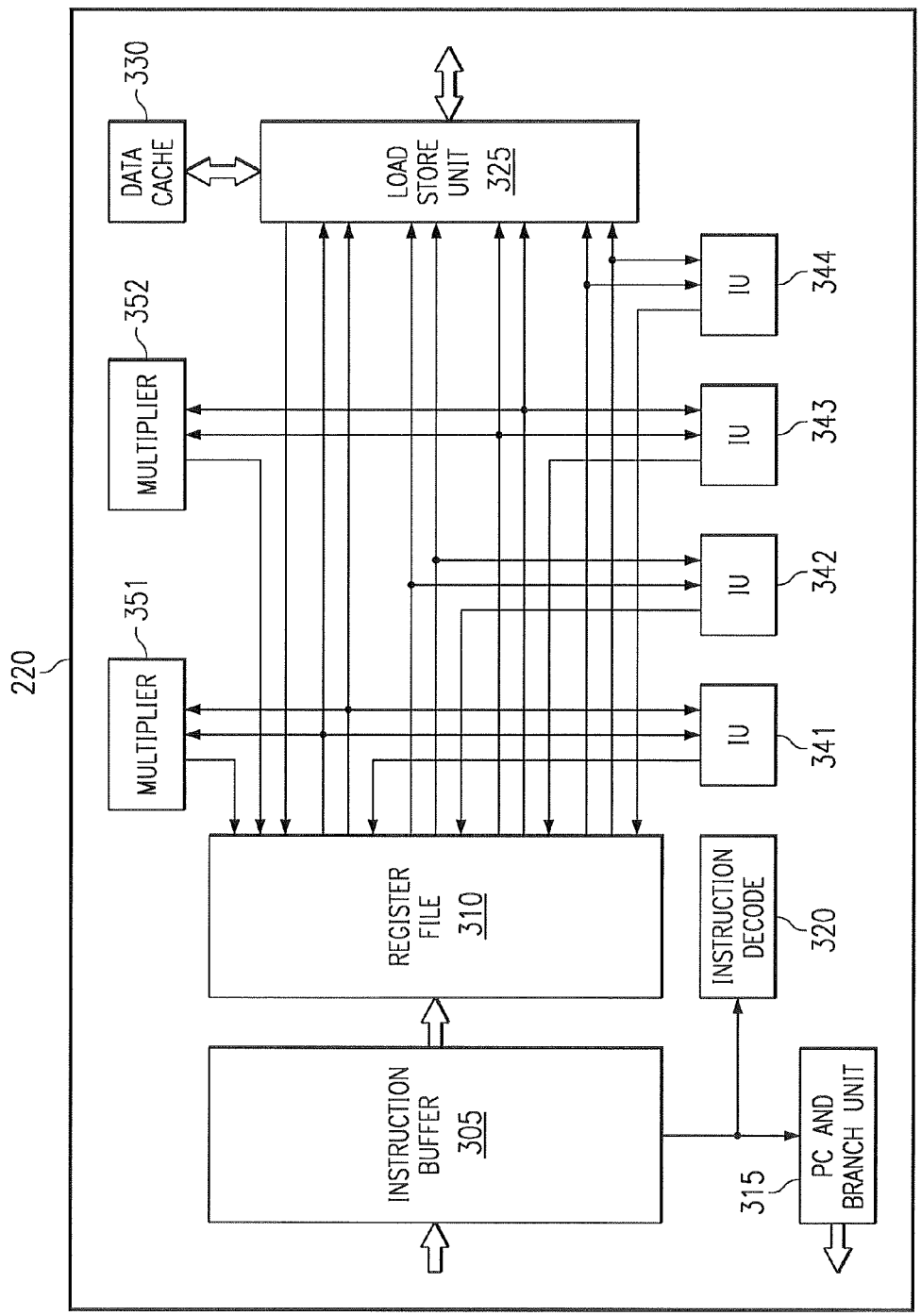
FIG. 3 illustrates a cluster in the exemplary data processor according to one embodiment of the present invention.

FIG. 3 is a more detailed block diagram of branching cluster 220 in data processor 100 according to one embodiment of the present invention. Branching cluster 220 comprises instruction buffer 305, register file & rewindable register buffer unit 310, program counter and branch unit 315, instruction decoder 320, load store unit 325, data cache 330, integer units 341-344, and multipliers 351-352. Cluster 220 is implemented as an instruction pipeline.

Instructions are issued to an operand read stage associated with register file 310 and then propagated to the execution units (i.e., integer units 341-244, multipliers 351-352). Exemplary cluster 220 accepts one bundle comprising one to four syllables in each cycle. The bundle may consist of any combination of four integer operations, two multiplication operations, and one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information. While each of the clusters 220-222 is capable of computing branch conditions, only branching cluster 220 is operable to perform branch address computations.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

According to the illustrated embodiment, when a conditional branch instruction is executing in one of non-branching clusters 221-222, the program counter is operable to compute a branch address and a next program counter address. The non-branching cluster 221-222 executing the conditional branch instruction computes a branch condition and communicates the same to the program counter. The program counter includes an input channel associated therewith to receive the computed branch condition, and, in response thereto, to select one of the branch address or the next program counter address.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
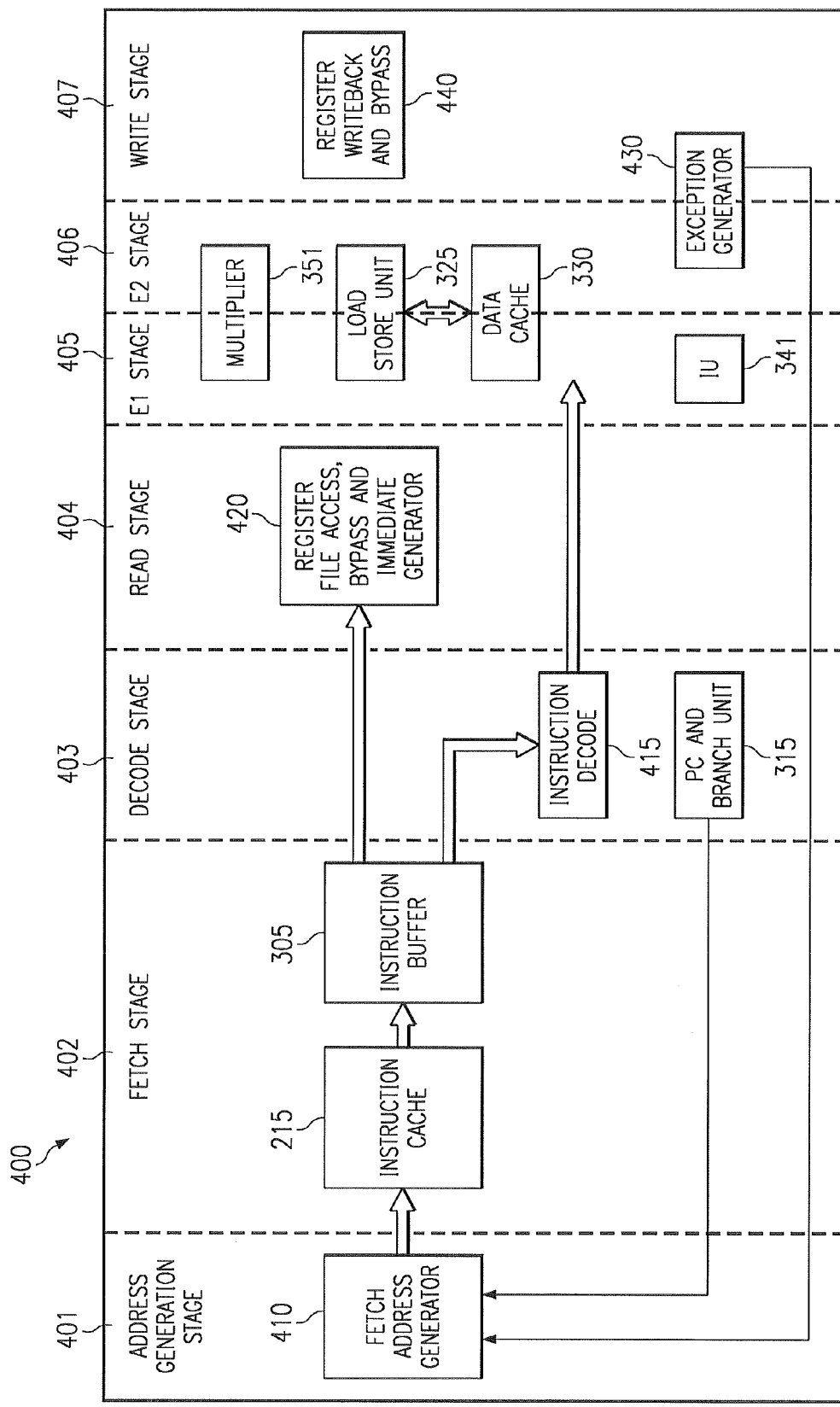
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 400, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to a execution units in E1 stage 405 and E2 stage 406. According to the illustrated embodiment, when a conditional branch instruction is sensed in the execution pipeline of a non-branching cluster 221-222, data processor 100 also issues a shadow conditional branch instruction in branching cluster 220 causing program counter and branch unit 315 to perform a branch address computation as well as a next program counter address computation, thereby enabling program counter and branch unit 315 to evaluate branch instructions detected within the 128-bit wide words.

The non-branching cluster executing the conditional branching instruction computes a branch condition and circuitry associating clusters 220-221 communicates the computed branch condition from the non-branching cluster to branching cluster 220. An important aspect of this implementation is that a taken branch incurs a one cycle delay and the instruction being incorrectly fetched while the branch instruction is evaluated is discarded.

According to the embodiment illustrated in FIG. 2B, power-down controller 250 monitors instruction cache 215 and instruction execution pipeline 400 to identify power-down conditions associated with the same. Three identifiable power-down conditions are (i) a non-operation in instruction execution pipeline 400, (ii) a tight-loop condition in instruction fetch buffer 305, or (iii) an idle-loop condition.

Power-down controller 250 detects a non-operation in instruction execution pipeline 400 in two ways. First, with respect to real non-operations (i.e., non-inserted NOPs), power-down controller 250 identifies the same while decoding is undertaken. Second, with respect to inserted non-operations, power-down controller 250 identifies the same at dispersion (i.e., at the time of insertion). This may advantageously be implemented in hardware.

Power-down controller 250 detects a tight-loop condition in instruction fetch buffer 305 at instruction decode when tight loops can be defined as those fining within instruction fetch buffer 305—those that fit within instruction fetch buffer 305 are recognized by the jump displacement and buffer sizing. This may advantageously be implemented in hardware.

Power-down controller 250 detects an idle-loop condition by determining whether the instructions in the tight loop in instruction fetch buffer 305 are non-operations (i.e., if all non-operations, then the tight loop may accurately be considered an idle loop). This may advantageously be implemented in hardware.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

An important aspect of the present embodiment is that power-down controller 250 automatically powers down key circuitry in response to recognition of one or more power-down conditions as above-described.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

An important aspect of the present embodiment is that power-down controller 250 automatically powers down key circuitry in response to recognition of one or more power-down conditions as above-described.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

Load operations that transfer data from data cache 330 to the register files are performed in E1 stage 405, E2 stage 406, and write stage 407. Data shifting is performed early in write stage 407 prior to loading the data into the appropriate register file in register write back and bypass block 440. In order to maximize processor throughput, the present invention implements bypassing circuitry in the pipeline that permits data from load word operations to bypass the shifting circuitry in write stage 407.

An important aspect of the present embodiment is that power-down controller 250 automatically powers down key circuitry in response to recognition of one or more power-down conditions as above-described.

Figure 5:
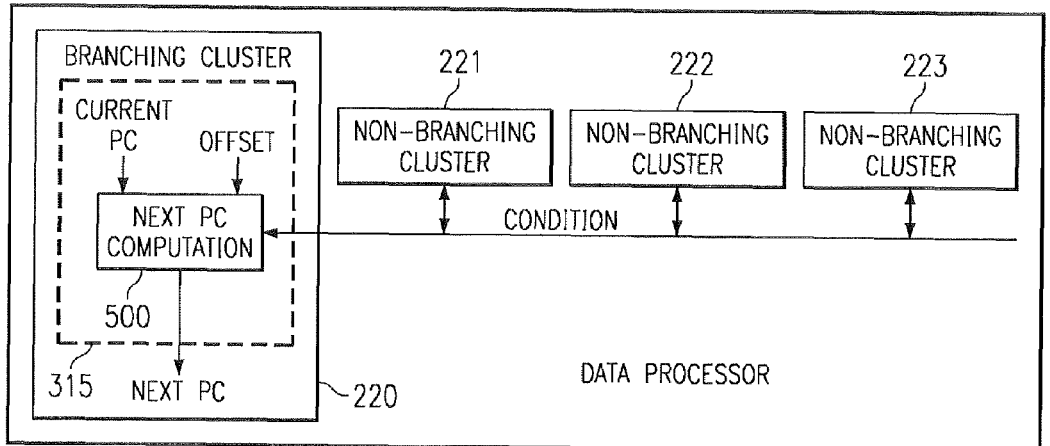
FIG. 5 illustrates an exemplary data processor having a branching cluster and three non-branching clusters according to one embodiment of the present invention.

FIG. 5 illustrates a data processor 100 having a clustered architecture according to one embodiment of the present invention. For purposes of illustration, concurrent reference is implicitly made to the exemplary embodiments of FIGS. 1 to 4.

Exemplary data processor 100 illustratively includes a branching cluster 220 and three non-branching clusters 221-223, each of which is capable of computing branch conditions. Each cluster 220-223 comprises an instruction execution pipeline comprising N processing stages, wherein each processing stage is capable of performing at least one of a plurality of execution steps associated with a pending instruction being executed by the instruction execution pipeline.

According to the present embodiment, exemplary branching cluster 220 includes program counter and branch unit 315 that illustratively includes next PC computation circuitry 500. Exemplary next PC computation circuitry 500 is operable to determine the address of the next instruction to be executed by data processor 100. When an instruction executing in a non-branching cluster 221 is a conditional branching instruction, branching cluster 220, via program counter and branch unit 315 and next PC computation circuitry 500, computes both a next program counter address and a branch address. The foregoing is accomplished while non-branching cluster 221 computes the condition and communicates the computed branch condition from non-branching cluster 221 to branching cluster 220. Next PC computation circuitry 500 then selects among one of the computed next program counter address and the computed branch address in response to the received computed branch condition.

According to the present embodiment, non-branching cluster 221, branching cluster 220 (particularly, program counter and branch unit 315 and next PC computation circuitry 500), and the wires associating the same cooperate to form remote conditional branching control circuitry that causes branching cluster 220 to perform a branch address computation in response to sensing a conditional branch instruction in non-branching cluster 221, and to communicate a computed branch condition from non-branching cluster 221 to branching cluster 220. This is accomplished, according to this embodiment, by issuing a shadow conditional branch instruction in branching cluster 220 to perform branch address computation in response to sensing the conditional branch instruction in non-branching cluster 221. In a multi-cluster environment it is advantageous to begin address computation as early in the instruction execution pipeline as possible. The implementation described here performs the next PC computation on one branching cluster, but uses condition information from at least one of the non-branching clusters.

In particular, a conditional branch instruction that requires condition data from a cluster other than branching cluster 220 causes issuance of two identical branches—one on cluster 220 and one on the cluster providing the condition data, cluster 221. A priority encoder may suitably be used to give precedence to conditions other than cluster 220. Thus, the only information that needs communication between clusters 220 and 221 and program counter and branch unit 315 is condition data. This may suitably be encoded, for example, with two signals per cluster—data and valid.

An important aspect of this invention is that the principles thereof may suitably be extended to support multiple branches per cycle (multi-way branches) by exploiting multiple-issue capability of branching cluster 220. By way of example, if branching cluster 220 allows four instructions per cycle, branching cluster 220 may suitably support a four-way branch per cycle with the same technique. As such, other clusters (non-branching clusters, branching clusters, or both) can participate (i.e., non-branching cluster/other branching cluster cooperates with branching cluster 220) to the branch conditions (and priorities) by sending the appropriate condition bits to branching cluster 220.

In this way, FIG. 5 may also illustrate an exemplary multi-way branching structure wherein a clustered architecture is shown with four clusters that can execute a two-way branch per cycle. Consider the following code:

c1 cmp $b1.1= . . .
c3 cmp $b3.1= . . .
;;
;;
c0, c1 br L0, $b1, 1
c0, c3 br L1, $b3, 1
;;

Table 1

This code example shows execution of a 2-way branch using compare conditions from Clusters 221 and 223 and two instruction slots in branching cluster 220 for branch targets. The notation "c0,c1 br L0, $b1,1" indicates that two syllables are used: one syllable in cluster 220 to produce the branch target (and start the address computation) and one syllable in cluster 221 to send the condition register (in this case $b1.1) to branching cluster 220. Some delay (in the example: 1 extra cycle) may be necessary between the producer of the compare conditions and the branches. However this delay is exposed at the architecture level, and the compiler can apply known scheduling techniques to hide it when possible.

Figure 6:
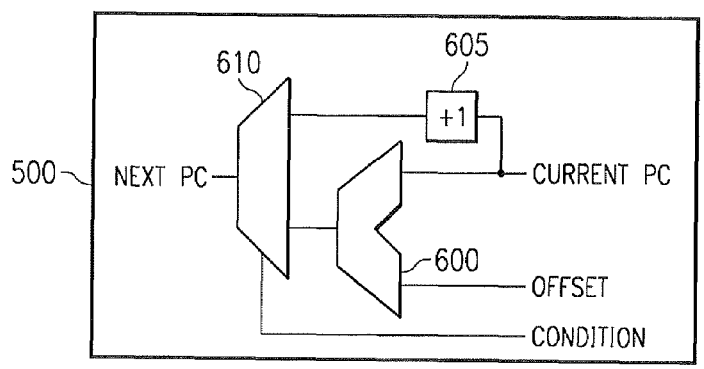
FIG. 6 illustrates a block diagram of exemplary next program computation circuitry according to one embodiment of the present invention.

FIG. 6 illustrates a block diagram of exemplary next PC computation circuitry 500 according to one embodiment of the present invention. Next PC computation circuitry 500 illustratively includes an adder circuit 600, a counter circuit 605 and a multiplexor 610. Each of adder circuit 600 and counter circuit 605 receive the current program counter as an input. Adder circuit 600 also receives an offset value (for branching) as another input. Multiplexor 610 receives as inputs the outputs of each of adder circuit 600 and counter circuit 605, and operates to select one of the same as a function of a condition signal.

By way of discussion, next PC computation circuitry 500 computes next program counter addresses. Commonly this is accomplished using counter circuit 605 to simply determine the next program counter address. However, when a conditional branch instruction is executing in one of non-branching clusters 221-223, program counter and branch unit 315 is operable to compute both a branch address and a next program counter address, as above-described. It is clear that the branch address calculation, which requires performing an addition, can proceed in parallel with the condition computation in the non-branching cluster. Furthermore, the application of the condition to the calculation consists purely of setting up a multiplexor—inherently a fast operation.

Figure 7:
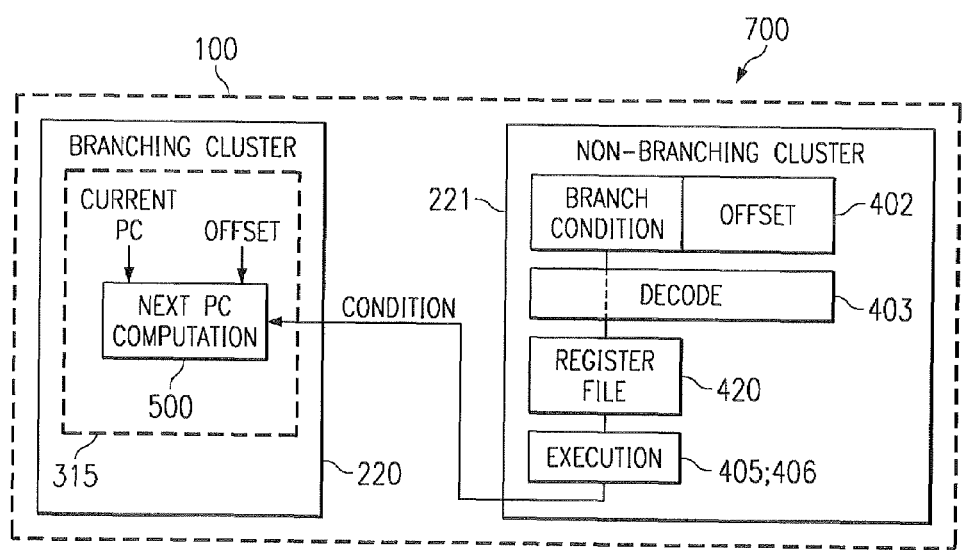
FIG. 7 illustrates a conceptual diagram of remote conditional branching control circuitry according to one embodiment of the present invention.

FIG. 7 illustrates a conceptual diagram of remote conditional branching control circuitry (generally designated 700) according to one embodiment of the present invention. Exemplary remote conditional branching control circuitry 700 illustratively includes a branching cluster 220 and a non-branching cluster 221. Exemplary branching cluster 220 illustratively includes program counter and branch unit 315 that illustratively includes next PC computation circuitry 500. Exemplary non-branching cluster 221 illustratively includes fetch stage 402, decode stage 403, register file 420 and execution stage 405; 406.

Figure 8:
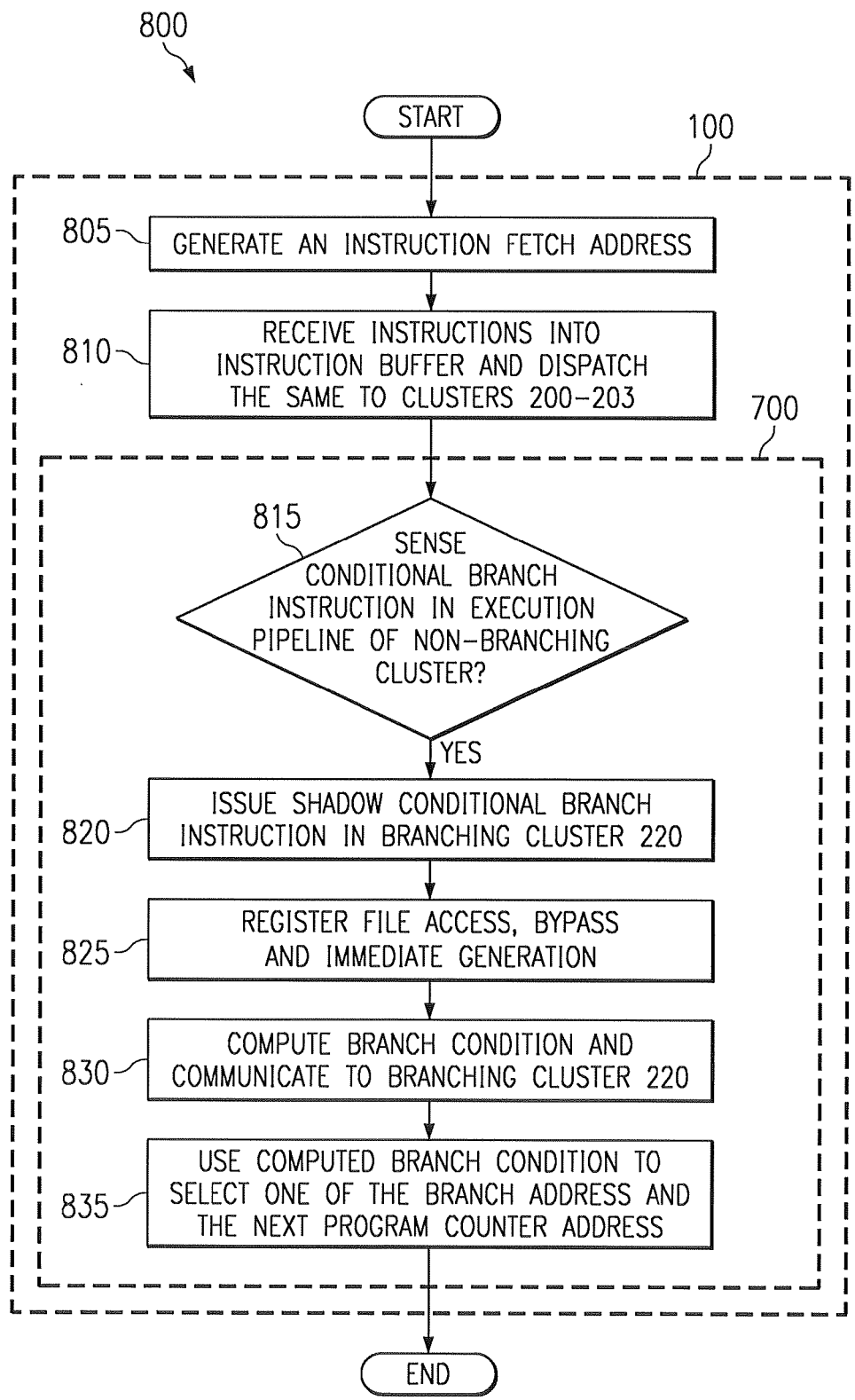
FIG. 8 illustrates a flow diagram of an exemplary method of operating a data processor according to one embodiment of the present invention.

For purposes of illustration, the functionality of remote conditional branching control circuitry 700 is described with concurrent reference to FIG. 8. FIG. 8 illustrates a flow diagram (generally designated 800) of an exemplary method of operating data processor 100 when a conditional branch instruction is executing in a non-branching cluster according to one embodiment of the present invention.

To begin, data processor 100 enters fetch stage 402 first, generating an instruction fetch address (process step 805; FADDR) and then enters decode stage 403 second. During decode stage 403, instruction buffer 305 of FIG. 3 receives instructions as 128-bit wide words from instruction cache 215 and the instructions are dispatched to a cluster 220-222 of FIGS. 2A and 2B (process step 810).

According to the illustrated embodiment, when a conditional branch instruction is sensed in the execution pipeline of a non-branching cluster 221 ("Y" branch of decision step 815), data processor 100 issues a shadow conditional branch instruction in branching cluster 220 causing program counter and branch unit 315 to perform a branch address computation as well as a next program counter address computation (process step 820), thereby enabling program counter and branch unit 315 via next PC computation circuitry 500 to evaluate branch instructions detected within the 128-bit wide words.

Data processor 100 continues through the read stage where operands are generated by register file access, bypass and immediate (constant) generation block 420 (process step 825). The sources for operands are the register files, the constants (immediates) assembled from the instruction bundle, and any results bypassed from operations in later stages in the instruction pipeline.

Data processor 100 continues through the instruction execution stage 405; 406, and non-branching cluster 221 executing the conditional branching instruction computes a branch condition and circuitry associating clusters 220-221 communicates the computed branch condition from non-branching cluster 221 to branching cluster 220 (Process step 830). According to this implementation, a taken branch incurs a one cycle delay and the instruction being incorrectly fetched while the branch instruction is evaluated is discarded.

Importantly, conditional branch instructions require the calculation of a condition to decide whether the branch should be taken and a destination address. In a clustered architecture, it is advantageous if the branch condition can be computed on any cluster 220-223 to eliminate movement of data between clusters. In contrast, the computation of the destination address frequently consists of adding a constant to current program counter and does not require the ability to perform the calculation on an arbitrary cluster. Traditionally, a difficulty associated with implementing conditional branch instructions is their existence on critical instruction execution paths. This difficulty may suitably be reduced by performing the address calculation in parallel with the computation of the branch condition as above-described.

Lastly, branching cluster 220, via next PC computation circuitry 500 uses the computed branch condition to select one of the branch address or the next program counter address (process step 835). From the foregoing, it is clear that the exemplary branch architecture for a clustered machine illustrates several aspects of the principles hereof, namely, (i) early computation of the branch address minimizes taken branch penalties: if the branch address is computed late in the pipeline, cycles are lost before the instruction at the new address can be fetched—indicating that next PC address computation should be centralized in a single location; and (ii) issuance of compare operations on multiple clusters because working sets are distributed across the clusters, movement of all branch information to one specific cluster would unnecessarily increase inter-cluster traffic—branching condition computation should be decentralized to the individual clusters.

Figure 9:
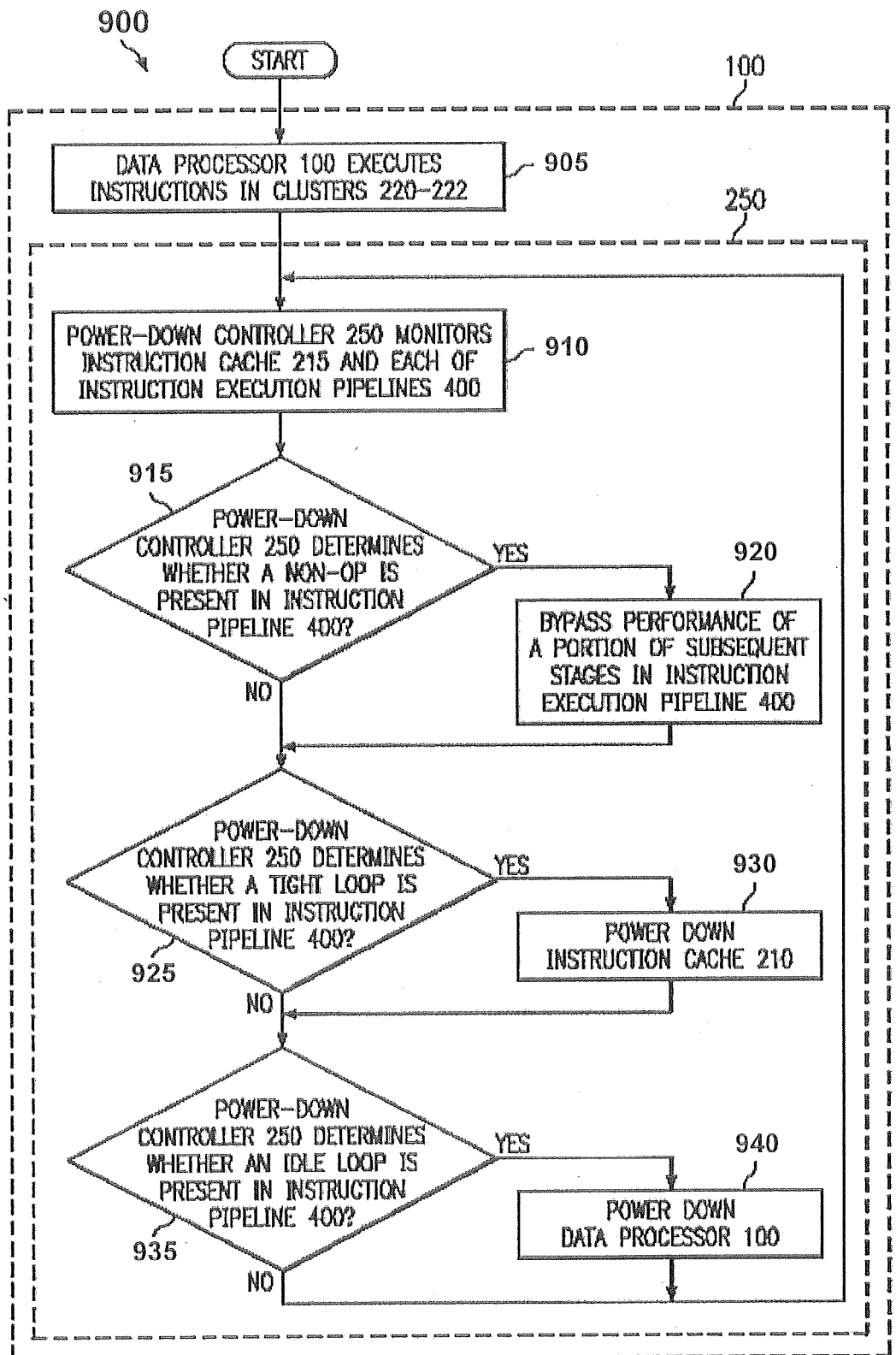
FIG. 9 illustrates a flow diagram of another exemplary method of operating a data processor according to one embodiment of the present invention.

FIG. 9 illustrates a flow diagram (generally designated 900) of an exemplary method of operating data processor 100 to power down selected portions of data processor 100 according to one embodiment of the present invention. For purposes of illustration, concurrent reference is made to the exemplary embodiments of FIGS. 1 to 4.

To begin, data processor 100 executes instructions in clusters 220-222 (process step 905), wherein each cluster 220-222 comprises an instruction execution pipeline having seven processing stages, namely, address generation stage 401, fetch stage 402, decode stage 403, read stage 404, first execution (E1) stage 405, second execution (E2) stage 406, and write stage 407. Each of the seven processing stages 401-407 is capable of performing at least one of a plurality of execution steps associated with instructions being executed by clusters 220-222.

Power-down controller 250 monitors instruction cache 215 and each instruction execution pipeline 400, including instruction buffer 305 (process step 910). According to the present embodiment, during decode stage 403. instruction buffer 305 receives instructions from instruction cache 215 and the instructions are dispatched to a cluster 220-222.

Power-down controller 250 operates to identify power-down conditions associated with instruction cache 215 and each instruction execution pipeline 400, namely (i) a non-operation in instruction execution pipeline 400, (ii) a tight-loop condition in instruction fetch buffer 305, or (iii) an idle-loop condition.

Power-down controller 250 monitors each instruction for the presence of non-operations (decision step 915). Exemplary power-down controller 250 detects a non-operation in instruction execution pipeline 400 in two ways. First, with respect to real non-operations (i.e., non-inserted NOPs), power-down controller 250 identifies the same while decoding is undertaken. Second, with respect to inserted non-operations, power-down controller 250 identifies the same at dispersion (i.e., at the time of insertion). This may advantageously be implemented in hardware. In the event that a non-operation is detected ("Y" branch of decision step 915), then power-down controller 250 bypasses performance of at least a portion of subsequent processing stages associated with the executing instruction having the non-operation (process step 920), thereby reducing power consumption in the subsequent processing stages as the executing instruction passes through the instruction execution pipeline (i.e., stages 404-407).

Power-down controller 250 monitors instruction fetch buffer 305 for the presence of tight loops (decision step 925). Exemplary power-down controller 250 detects a tight-loop condition in instruction execution pipeline 400 by monitoring instruction fetch buffer 305 at instruction decode when tight loons are defined, namely loops fitting within instruction fetch buffer 305 (i.e., recognized by the jump displacement and buffer sizing). This may advantageously be implemented in hardware. In the event that a tight-loop condition is detected ("Y" branch of decision step 925), then power-down controller 250 operates to power down instruction cache 210 (process step 930; e.g., responsive to identifying a tight-loop condition in instruction fetch buffer 305) pending termination of the tight loop.

Power-down controller 250 monitors each tight loop for the presence of idle loops (decision step 935). Exemplary power-down controller 250 detects an idle-loop condition in instruction execution pipeline 400, illustratively by monitoring instruction fetch buffer 305 to determine whether the instructions in the tight loop in instruction fetch buffer 305 are non-operations (i.e., if all non-operations, then the tight loop may accurately be considered an idle loop). This may advantageously be implemented in hardware. In the event that an idle-loop condition is detected ("Y" branch of decision step 935), then power-down controller 250 operates to power down data processor 100 (process step 940), thereby stalling data processor 100 pending an interrupt.

Although the present invention has been described in detail, those skilled in the art should understand that they can make various changes, substitutions and alterations herein without departing from the spirit and scope of the invention in its broadest form.

What is claimed is:

1. A data processor having a clustered architecture comprising:
    a branching cluster and a non-branching cluster, each capable of fully executing at least some instructions to obtain a result of an executed instruction and of computing branch conditions, said branching cluster operable to perform branch address computations for said branching cluster and said non-branching cluster, the non-branching cluster incapable of performing branch address computations; and
    remote conditional branching control circuitry that causes said branching cluster to perform a branch address computation in response to sensing a conditional branch instruction in said non-branching cluster, and that communicates a computed branch condition from said non-branching cluster to said branching cluster.

2. The data processor as set forth in claim 1 wherein each of said branching cluster and said non-branching cluster comprises at least one register file.

3. The data processor as set forth in claim 1 wherein each of said branching cluster and said non-branching cluster comprises an instruction execution pipeline comprising N processing stages, each of said N processing stages capable of performing at least one of a plurality of execution steps associated with a pending instruction being executed by said instruction execution pipeline.

4. The data processor as set forth in claim 1 wherein said remote conditional branching control circuitry further causes said branching cluster to perform a next program counter address computation in response to sensing a conditional branch instruction in said non-branching cluster.

5. The data processor as set forth in claim 4 wherein said remote conditional branching control circuitry selects one of said computed next program counter address and said computed branch address in response to said computed branch condition.

6. The data processor as set forth in claim 5 wherein said remote conditional branching control circuitry comprises a multiplexor that is responsive to said computed branch condition.

7. The data processor as set forth in claim 1 wherein said data processor issues a shadow conditional branch instruction in said branching cluster to perform said branch address computation in response to sensing said conditional branch instruction in said non-branching cluster.

8. For use in a data processor comprising a branching cluster and a non-branching cluster, each capable of fully executing at least some instructions to obtain a result of an executed instruction and of computing branch conditions, said branching cluster operable to perform branch address computations for said branching cluster and said non-branching cluster, a method of operating said data processor comprising the steps of:
    computing a branch address in the branching cluster in response to sensing a conditional branch instruction in said non-branching cluster, the non-branching cluster incapable of performing branch address computations; and
    communicating a branch condition computed by said non-branching cluster from said non-branching cluster to said branching cluster.

9. The method of operating said data processor as set forth in claim 8 further comprising the step of computing said branch condition in said non-branching cluster.

10. The method of operating said data processor as set forth in claim 9 further comprising the step of computing a next program counter address.

11. The method of operating said data processor as set forth in claim 10 further comprising the step of selecting one of said computed next program counter address and said computed branch address in response to said computed branch condition.

12. The method of operating said data processor as set forth in claim 8 wherein each of said branching cluster and said non-branching cluster comprises an instruction execution pipeline comprising N processing stages, said method further comprising the step of performing in each of said N processing stages at least one of a plurality of execution steps associated with a pending instruction being executed by said instruction execution pipeline.

13. The method of operating said data processor as set forth in claim 8 further comprising the step of issuing a shadow conditional branch instruction in said branching cluster to perform said branch address computation in response to sensing said conditional branch instruction in said non-branching cluster.

14. A processing system comprising:
    a data processor having a clustered architecture;
    a memory associated with said data processor;
    a plurality of peripheral circuits associated with said data processor for performing selected functions in association with said data processor;
    wherein said data processor comprises:
        at least a branching cluster and a non-branching cluster that are each capable of fully executing at least some instructions to obtain a result of an executed instruction and of computing branch conditions, said branching cluster operable to perform branch address computations for said at least said branching cluster and said non-branching cluster, the non-branching cluster incapable of performing branch address computations; and
        remote conditional branching control circuitry that causes said branching cluster to perform a branch address computation in response to sensing a conditional branch instruction in said non-branching cluster, and that communicates a computed branch condition from said non-branching cluster to said branching cluster.

15. The processing system as set forth in claim 14 wherein each of said branching cluster and said non-branching cluster comprises at least one register file.

16. The processing system as set forth in claim 14 wherein each of said at least said branching cluster and said non-branching cluster comprises an instruction execution pipeline comprising N processing stages, each of said N processing stages capable of performing at least one of a plurality of execution steps associated with a pending instruction being executed by said instruction execution pipeline.

17. The processing system as set forth in claim 14 wherein said remote conditional branching control circuitry further causes said branching cluster to perform a next program counter address computation in response to sensing a conditional branch instruction in said non-branching cluster.

18. The processing system as set forth in claim 17 wherein said remote conditional branching control circuitry selects one of said computed next program counter address and said computed branch address in response to said computed branch condition.

19. The processing system as set forth in claim 18 wherein said remote conditional branching control circuitry comprises a multiplexor having an input channel associated with said non-branching cluster, said multiplexor responsive to said computed branch condition.

20. The processing system as set forth in claim 14 wherein said data processor issues a shadow conditional branch instruction in said branching cluster to perform said branch address computation in response to sensing said conditional branch instruction in said non-branching cluster.

* * * * *

UNITED STATES PATENT AND TRADEMARK OFFICE
CERTIFICATE OF CORRECTION

PATENT NO. : 7,337,306 B2  Page 1 of 1
APPLICATION NO. : 09/751410
DATED : February 26, 2008
INVENTOR(S) : Mark Owen Homewood et al.

It is certified that error appears in the above-identified patent and that said Letters Patent is hereby corrected as shown below:

In column 11, line 39, delete "fining" and insert -- fitting --, therefor.

In column 16, line 41, delete "loons" and insert -- loops --, therefor.

Signed and Sealed this

Fifteenth Day of July, 2008

JON W. DUDAS
*Director of the United States Patent and Trademark Office*